UNITED STATES PATENT OFFICE.

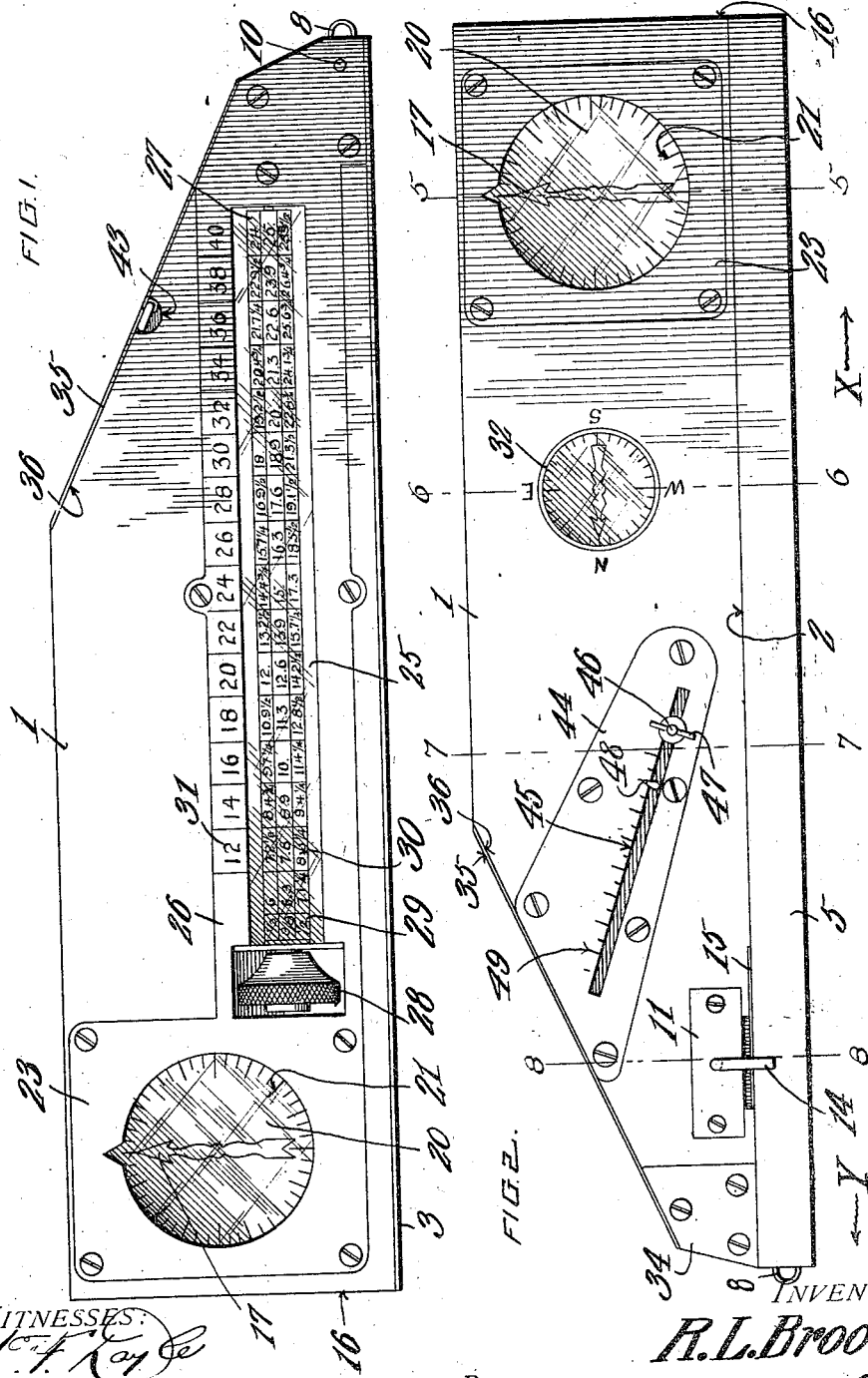

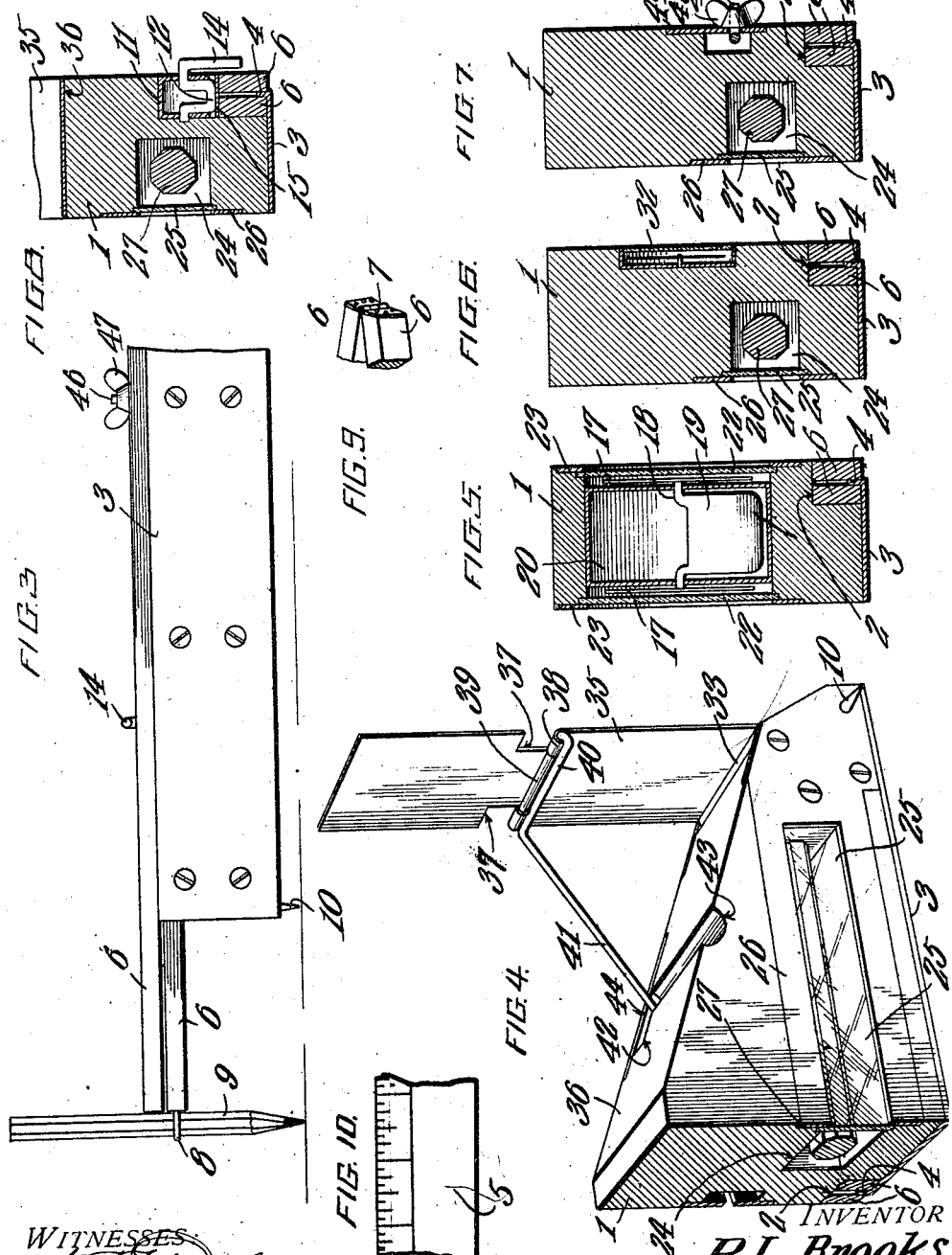

ROBERT L. BROOKS, OF BEAUKISS, TEXAS.

PLUMB-LEVEL.

1,035,944.

Specification of Letters Patent. Patented Aug. 20, 1912.

Application filed June 3, 1911. Serial No. 631,054.

*To all whom it may concern:*

Be it known that I, ROBERT L. BROOKS, a citizen of the United States, residing at Beaukiss, in the county of Williamson and State of Texas, have invented a new and useful Plumb-Level, of which the following is a specification.

It is the object of the present invention to provide a tool adapted to be employed in determining and in laying off the pitch of rafters.

A further object of the invention is to provide novel means for maintaining the different portions of the device whereby the pitch of the rafters is laid off, in proper relation with respect to each other.

A further object of the invention is to provide a compound tool of novel and improved form, capable of a wide variety of uses, the constitutent elements of the tool cooperating with each other in a novel and improved manner.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is an elevation of one side of the tool: Fig. 2 is an elevation of the opposite side of the tool from that appearing in Fig. 1; Fig. 3 is a fragmental bottom plan; Fig. 4 is a perspective of one end of the device, showing a portion thereof disposed in position to be employed in laying off rafter angles and the like; Fig. 5 is a section on the line 5—5 of Fig. 2; Fig. 3 is a section on the line 6—6 of Fig. 2; Fig. 7 is a section on the line 7—7 of Fig. 2; Fig. 8 is a section on the line 8—8 of Fig. 2; Fig. 9 is a fragmental perspective of a movable member which is slidably assembled with the body, for movement in a fixed direction; and Fig. 10 is a fragmental plan of a rule which constitutes a part of the device.

In carrying out the invention there is provided as a primary and fundamental element, a body 1, having in one edge, a groove 2, extended the full length of the body. Applied to the bottom of the body 1, is a plate 3, having a flange 4, upstanding into the groove 2.

A movable member 5 is provided, this member 5 comprising parts 6, hinged together at one end as shown at 7 (see Fig. 9). This movable member 5 may be graduated in any desired manner so as to be removed from the body 1 and to be used as a ruler, when desired. The parts 6 of the movable member 5, are adapted to be folded together, as appearing in Fig. 6, one of said parts being adapted to be engaged slidably between the flange 4 and the body 1, as shown in Figs. 5, 6 and 7, while the other of said parts 6 is adapted to be folded down upon the outside of the flange.

One of the parts 6 of the movable member 5 is equipped in its end, with an eye 8, through which may be thrust a pencil 9. The movable member 5 may be slid to and fro upon the body, in a fixed direction, so as to cause the pencil 9 to be located at various distances beyond one end of the body, as clearly shown in Fig. 3, the graduations upon the member 5 being employed for determining the distance between the end of the body and the pencil 9. When the parts above referred to are positioned as shown in Fig. 3, the structure may be used as a compass for striking a circle, a spur 10, outstanding from the body 1, serving as a pivot for the pencil 9 for striking the arc. Likewise, when the parts are positioned as shown in Fig. 3, the device may be used as a marking gage, as will be understood readily. In order to maintain the member 5 in fixed positions, a locking device is provided, upon the body 1. In fashioning this locking device, a casing 11 is let into one side of the body 1, adjacent one end of the body, and in this casing 1 is pivoted a cam shaft 12, having a handle 14, accessible from the exterior of the body. The cam member 12 is adapted to engage a spring plate 15, secured to the body at one end, the spring plate 15 being adapted, at its free end, to bear against one of the parts 6 of the member 5. By manipulating the cam member 12, the member 5 may be held in adjusted positions upon the body 1.

Obviously, if desired, the parts 6 may be swung into alinement, whereupon both parts may slide between the flange 4 and the body 1. Moreover, the member 5 may be slid longitudinally of the body 1, in the direction of the arrow X of Fig. 2, so that one end of the member 5 will outstand beyond one end 16 of the body 1, which said end 16 is at right angles to the line of sliding movement of the member 5. Under such circumstances, the member 5 coöperates with the end face 16 in such a manner that the device may be employed for use as a try-square.

The body 1, adjacent one end, is provided with a plumb level arm 17, carried by a shaft 18, having a counter-weight 19, located within a case 20, mounted in a suitable opening in the body 1, the shaft 18 being journaled for rotation in the case 20. Upon the outer faces of the case 20 there are annular graduations 21, upon which the plumb level arm 17 is adapted to indicate, the graduated faces of the case 20 being closed beneath transparent plates 22, held in place by frames 23, applied to opposite faces of the body 1.

In one face of the body 1 there is a longitudinally extended recess 24, partially housed in by a transparent plate 25, held in place by an arm 26, preferably, although not necessarily, constituting a projection from one of the frame members 23, as shown in Fig. 1. Journaled for rotation in the recess 24, to the rear of the transparent plate 25, is a shaft 27, having at one end a turning knob 28, accessible for manipulation, from the outside of the body 1. At one end, the shaft 27 is surrounded by a ring of graduations denoted by the numeral 29, these graduations 29 indicating different pitches. Beyond the ring of graduations 29, there are other rings of graduations, denoted by the numeral 30, these graduations 30 indicating rafter lengths. Upon the arm 26, there are graduations denoting different spans, each one of the graduations denoted by the numeral 31, being alined with one of the rings of graduations denoted by the numeral 30.

Noting Fig. 1, it will be seen that the operator can determine at a glance, the rafter length for a given span and pitch, and likewise, with a given span and rafter length, the required pitch may readily be read off.

Let into one side of the body 1, intermediate the ends of the body, is a mariner's or surveyor's compass 32, this compass 32 being of common and well known construction, and meriting no specific description.

Hingedly connected with the body 1, adjacent one end of the body as shown at 33, and as most clearly appearing in Fig. 4, is an arm 35, the same preferably taking the form of a flat plate of metal. The arm 35 may be hingedly connected with a plate 34, applied to one face of the body 1, as shown in Fig. 2, and with one end of the member 26, which member 26 appears most clearly in Fig. 1. The arm 35 is adapted to be turned down flat against a beveled face 36 upon the body 1. The edges of the arm 35 are cut away, as shown at 37, the material formed by this cutting away at 37, being bent to form knuckles 38, receiving pivotally, a finger 39, bent back upon itself as shown at 40, the finger merging into a rectangularly disposed connecting member 41, adapted to move in a groove 42, formed in one of the side faces of the body 1. Extended transversely of the beveled face 36, is a slot 43, adapted to receive the parts 39, 40 and 38, when the arm 35 is folded down flat against the beveled face 36.

The groove 42 is covered by a plate 44, applied, as shown in Fig. 2, to one of the side faces of the body 1. In this plate 44, there is a longitudinally extended slot 45, through which projects a finger 46, formed upon one end of the connecting member 41. Upon the finger 46 there is a clamping member, preferably a wing nut 47, adapted to bear against the plate 44, to hold the connecting member 41 against movement with respect to the plate. The connecting member 41, in the vicinity of the finger 46, is provided with an indicator 48, adapted to register upon graduations 49, inscribed upon the plate 44, along one edge of the slot 45. These graduations indicate different pitches.

In practical operation, by loosening the nut 47, the arm 35 may be tilted into various outstanding positions, the arm, under such circumstances, defining different angles with respect to the lower edge of the body 1, the indicator 48 moving along the graduations 49, to indicate different pitches set off by the arm 35, when the same is tilted. Obviously, by manipulating the nut 47, the arm 35 may be held in any position to which it has been tilted.

It will be understood readily, that by manipulating the handle member 14, the cam 12 is thrown to one side, to set free for sliding movement upon the body 1, the movable member 5, whereupon the said member 5 may be slid beyond one end of the body, and locked in position, so that the member 5 may coöperate with the arm 35, in the measuring and laying off of angles and pitches.

Noting Fig. 1, and comparing the showing of this figure with that of Figs. 4 and 3, it will be seen that the operator of the device may secure from the indicating mechanism shown in Fig. 1, the requisite data with respect to pitches, rafter lengths and truss spans, and, after these data have been acquired, the member 5 and the arm 35, may be manipulated, to lay off the pitches.

By employing the arm 35 in connection with the lower edge of the body 1, a given angle may be laid off, and by employing the arm 35 in connection with the member 5, when the latter is extended beyond one end of the body 1, as shown in Fig. 3, the supplement of the angle above referred to, may be laid off.

Having thus described the invention, what is claimed is:—

1. A device of the class described comprising a body; an arm hinged at one end to the body; a straight movable member held in contact with the body for right line movement only, parallel to the length of the movable member and parallel to the length of the body, and having a straight fiducial edge, adapted to be advanced beyond one end of the body, to define an angle with the arm; means for holding the arm in adjusted positions with respect to the fiducial edge of the movable member; and means for holding the movable member in adjusted positions along its line of movement.

2. A device of the class described comprising a body having a beveled end face; an arm hinged to the body and adapted to lie against said face; a connection hinged to the arm and movable in close vicinity to the body; and body-engaging means upon the connection, for maintaining the arm in adjusted positions.

3. A device of the class described comprising a body having an opening in one face; an arm hinged thereto; a connection pivoted to the arm and adapted to move in the opening; a plate covering the opening, and provided with a slot, the plate being graduated, along one edge of the slot, and the connection having a finger adapted to protrude through said slot; and a clamping member upon the finger, adapted to engage the plate, to hold the arm in adjusted positions, the connection having an indicator, adapted to register upon the graduations.

4. A device of the class described comprising a body; a movable member slidably connected with the body, for movement in a fixed direction, said member comprising hingedly connected parts; an arm hinged to the body; and means for locking the arm in successive positions, to define different angles with respect to the movable member.

5. A device of the class described comprising a body having a groove in one edge; a plate secured to the lower face of the body and having an upstanding flange registering in the groove; a movable member comprising hingedly connected parts, one of which parts, when said parts are folded together, is adapted to slide between the flange and the body, said parts being adapted to be alined, whereby either of said parts may slide between the flange and the body; an arm hinged to the body, and adapted to assume different angles with respect to the movable member; and means for locking the arm in successive positions.

6. A device of the class described comprising a body; a movable member slidable upon the body in a fixed direction; a yieldable plate secured to the body, and adapted to bear upon said member; a cam lever pivoted in the body, and adapted to bear upon the plate; and an arm hinged to the body, and adapted to assume different angles with respect to said member.

7. A device of the class described comprising a body having a groove; a plate secured to the lower face of the body, and having a flange upstanding into the groove; a movable member comprising hingedly connected parts, one of which is adapted to slide between the flange and the body, the other of which may be folded down upon the outer face of the flange, both of said parts, when the same are alined, being adapted to slide between the flange and the body; a locking device upon the body, adapted to engage said member, to hold the same in successive positions upon the body; and an arm hinged to the body, and adapted to define different angles with respect to said member.

In testimony that I claim the foregoing as my own, I have hereto affixed my signature in the presence of two witnesses.

ROBERT L. BROOKS.

Witnesses:
W. M. HOUGHTON,
T. E. SCALES.